United States Patent
Takeda et al.

(10) Patent No.: US 10,651,915 B2
(45) Date of Patent: May 12, 2020

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Chongning Na, Beijing (CN); Huiling Li, Beijing (CN); Huiling Jiang, Beijing (CN); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/482,866

(22) PCT Filed: Feb. 2, 2018

(86) PCT No.: PCT/JP2018/003543
§ 371 (c)(1),
(2) Date: Aug. 1, 2019

(87) PCT Pub. No.: WO2018/143392
PCT Pub. Date: Aug. 9, 2018

(65) Prior Publication Data
US 2019/0356373 A1    Nov. 21, 2019

(30) Foreign Application Priority Data
Feb. 3, 2017    (JP) .................... 2017-018951

(51) Int. Cl.
*H04B 7/02*    (2018.01)
*H04B 7/06*    (2006.01)
(Continued)

(52) U.S. Cl.
CPC ......... *H04B 7/0628* (2013.01); *H04B 7/0639* (2013.01); *H04W 16/28* (2013.01);
(Continued)

(58) Field of Classification Search
CPC .. H04B 7/0628; H04B 7/0639; H04B 7/0632; H04B 7/0626; H04B 7/10; H04B 7/0456; H04B 7/0695; H04W 24/10; H04W 16/28
(Continued)

(56) References Cited

U.S. PATENT DOCUMENTS

2004/0157646 A1*   8/2004   Raleigh ............... H01Q 3/2605
                                                       455/562.1
2014/0328423 A1*  11/2014   Agee .................... H04B 7/0413
                                                          375/267
(Continued)

OTHER PUBLICATIONS

International Search Report issued in PCT/JP2018/003543 dated Apr. 24, 2018 (2 pages).
(Continued)

*Primary Examiner* — Don N Vo
(74) *Attorney, Agent, or Firm* — Osha Liang LLP

(57) ABSTRACT

The present invention is designed to suitably mitigate the decrease in communication throughput even when type-II feedback is used. According to one aspect of the present invention, a user terminal has a control section that determines a beam pattern that shows a fixed set of beams, and determines at least one beam that is not included in the beam pattern; and a transmission section that transmits feedback information related to the beam pattern and the at least one beam that is determined.

6 Claims, 11 Drawing Sheets

(51) Int. Cl.
*H04W 16/28* (2009.01)
*H04W 24/10* (2009.01)

(52) U.S. Cl.
CPC ........... *H04W 24/10* (2013.01); *H04B 7/0626* (2013.01); *H04B 7/0632* (2013.01)

(58) Field of Classification Search
USPC ........................................................ 375/267
See application file for complete search history.

(56) References Cited

U.S. PATENT DOCUMENTS

2015/0341091 A1* 11/2015 Park ..................... H04B 7/0456
375/267
2017/0111886 A1* 4/2017 Kim .................... H04W 72/042

OTHER PUBLICATIONS

Written Opinion of the International Searching Authority issued in PCT/JP2018/003543 dated Apr. 24, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

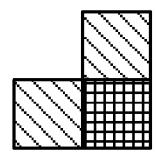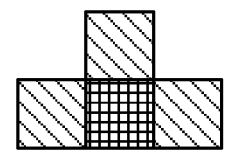
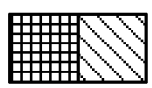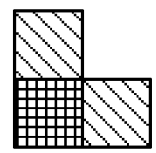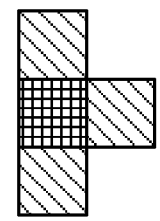
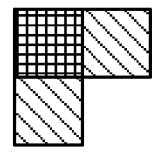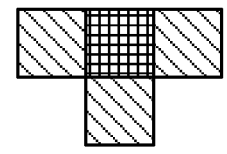
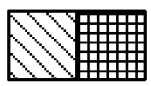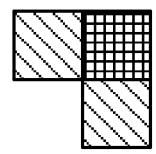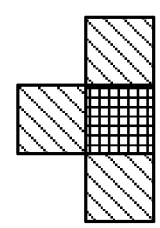
FIG. 2A
FIG. 2B
FIG. 2C

| BEAM SELECTION METHOD | NUMBER OF BEAMS | | | PAYLOAD FOR W1 [BITS] | | | | PAYLOAD FOR W2 (8-PSK) [BITS] | | |
|---|---|---|---|---|---|---|---|---|---|---|
| | L | L1 | L2 | LEADING BEAM | PATTERN | FREE SELECTION | TOTAL | PHASE | CO-PHASE | TOTAL |
| FREELY SELECTION | 2 | 1 | 1 | 9 | 0 | 4 | 13 | 3 | 6 | 9 |
| HYBRID | 2 | 1 | 1 | 9 | 0 | 4 | 13 | | | |
| FREELY SELECTION | 3 | 1 | 2 | 9 | 0 | 7 | 16 | 6 | 9 | 15 |
| HYBRID | 3 | 2 | 1 | 9 | 2 | 4 | 15 | | | |
| FREELY SELECTION | 4 | 1 | 3 | 9 | 0 | 9 | 18 | 9 | 12 | 21 |
| HYBRID | 4 | 2 | 2 | 9 | 2 | 7 | 18 | | | |
| | 4 | 3 | 1 | 9 | 2 | 4 | 15 | | | |
| FREELY SELECTION | 6 | 1 | 5 | 9 | 0 | 12 | 21 | 15 | 18 | 33 |
| HYBRID | 6 | 2 | 4 | 9 | 2 | 10 | 21 | | | |
| | 6 | 3 | 3 | 9 | 2 | 9 | 20 | | | |
| | 6 | 4 | 2 | 9 | 2 | 7 | 18 | | | |
| FREELY SELECTION | 8 | 1 | 7 | 9 | 0 | 13 | 22 | 21 | 24 | 45 |
| HYBRID | 8 | 2 | 6 | 9 | 2 | 12 | 23 | | | |
| | 8 | 3 | 5 | 9 | 2 | 11 | 22 | | | |
| | 8 | 4 | 4 | 9 | 2 | 9 | 20 | | | |
| | 8 | 5 | 3 | 9 | 2 | 8 | 19 | | | |

FIG. 6

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" and/or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

Also, in existing LTE systems (for example, LTE Rel. 8 to 13), a user terminal (UE: User Equipment) transmits uplink control information (UCI) by using uplink control channels (for example, PUCCH: Physical Uplink Control CHannel) and/or uplink data channels (for example, PUSCH: Physical Uplink Shared CHannel). The format of these uplink controls channel is referred to as "PUCCH format" and so on.

UCI includes at least one of a scheduling request (SR), retransmission control information in response to DL data (DL data channel (PDSCH: Physical Downlink Shared CHannel)) (also referred to as "HARQ-ACK (Hybrid Automatic Repeat reQuest-Acknowledgement)," "ACK," "NACK (Negative ACK)" and so on) and channel state information (CSI).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.).

For example, 5G/NR is under study to provide radio communication services referred to as "eMBB (enhanced Mobile Broad Band)," "mMTC (massive Machine Type Communication)," "URLLC (Ultra Reliable and Low Latency Communications)," and so on.

NR is under study so as to use beam forming (BF: Beam Forming) in both transmission and receipt, primarily for the purpose of lowering the difficulty of securing coverage, which usually follows the increase of carrier frequency, and reducing radio propagation loss.

In NR, a feedback method that reports more detailed information than existing CSI feedback information is under research, which is referred to as "type-II feedback." However, when a UE performs type-II feedback based on an existing beam selection method (existing codebook), problems such as a decrease in communication throughput and deterioration of received quality may arise.

The present invention has been made in view of the above, and it is therefore an object of the present invention to provide a user terminal and a radio communication method that can suitably mitigate the decrease in communication throughput even when type-II feedback is used.

Solution to Problem

According to one aspect of the present invention, a user terminal a control section that determines a beam pattern that shows a fixed set of beams, and determines at least one beam that is not included in the beam pattern, and a transmission section that transmits feedback information related to the beam pattern and the at least one beam that is determined.

Advantageous Effects of Invention

According to the present invention, even in the case of using type-II feedback, it is possible to suitably mitigate the decrease in communication throughput.

BRIEF DESCRIPTION OF DRAWINGS

FIGS. 2A to 2C are diagrams to show examples of beam patterns for use in a hybrid beam selection method according to one embodiment of the present invention;

FIG. 6 is a diagram to show an example of the number of bits required to feed back a type-II CSI report;

FIG. 12 is a diagram to show an example hardware structure of a radio base station and a user terminal according to one embodiment of the present invention.

DESCRIPTION OF EMBODIMENTS

Figure 1A:
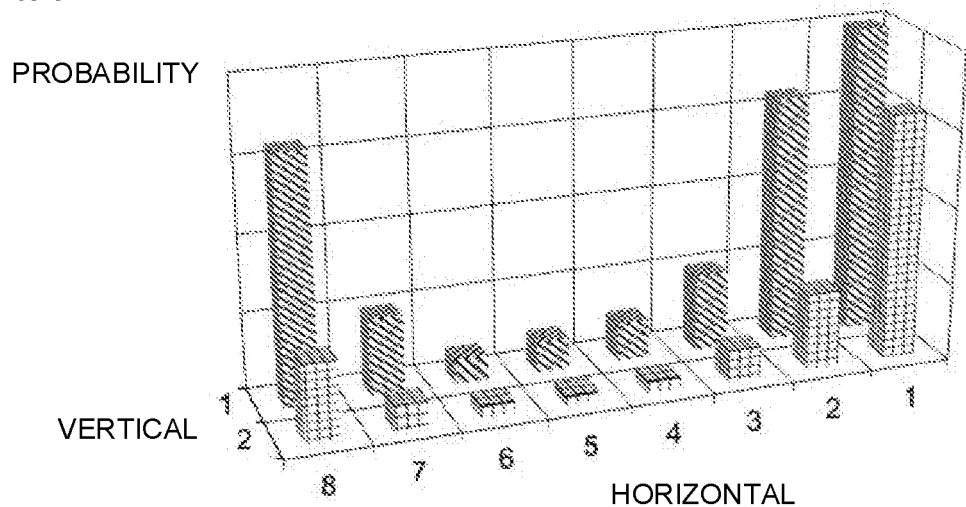
FIGS. 1A to 1C are diagrams to show examples of beam selection probability at two-dimensional antenna ports.

In 5G/NR, studies are underway to use beamforming (BF: BeamForming) for both transmission and receipt, primarily for the purpose of lowering the difficulty of securing coverage, which usually follows the increase of carrier frequency, and reducing radio propagation loss. BF is a technique for forming beams (antenna directivities) by controlling the amplitude and/or phase of signals transmitted and received via each element by using, for example, a very large number of antenna elements (this technique is also referred to as "precoding"). Note that MIMO (Multiple Input Multiple Output) to use a very large number of antenna elements like this is also referred to as "massive MIMO."

BF can be classified into digital BF and analog BF. Digital BF refers to a method of performing precoding signal processing on the baseband (for digital signals). In this case, inverse fast Fourier transform (IFFT)/digital-to-analog conversion (DAC)/RF (Radio Frequency) need to be carried out in parallel processes, as many as the number of antenna ports (RF Chains). Meanwhile, it is possible to form a number of beams to match the number of RF chains at any arbitrary timing.

Analog BF refers to a method of using phase shifting devices on RF. In this case, since it is only necessary to rotate the phase of RF signals, analog BF can be realized with simple and inexpensive configurations, but it is nevertheless not possible to form a plurality of beams at the same time.

Note that it is also possible to implement a hybrid BF configuration that combines digital BF and analog BF. Although study is in progress to introduce massive MIMO in future radio communication systems (for example, 5G), if it is attempted to form an enormous number of beams with digital BF alone, the circuit configuration becomes expensive. For this reason, a hybrid BF configuration may be used in 5G.

Now, in order to ensure that precoding is performed appropriately (including, for example, ensuring that precoding weights to improve the SINR (Signal to Interference plus Noise Ratio) on the receiving side are used), the transmitting side needs to apply adequate phase and amplitude adjustments based on information about the propagation paths from the transmitting side to the receiving side. Information about uplink propagation paths is important in formation of transmitting beams in UEs, and information about downlink propagation paths is important in formation of transmitting beams in base stations.

The information about propagation paths may refer to, for example, channel state information, information about channel characteristics and/or channel matrix. Note that the propagation path information may include the transceiver/receiver characteristics in UEs and base stations (also referred to as, for example, "BSs (Base Stations)," "eNBs," "gNBs," etc.), the results of phase and/or amplitude adjustments for beamforming, and so on. Here, the transceiver/receiver characteristics may refer to, for example, the frequency characteristics of the transceiver/receiver (for example, the phase and/or amplitude characteristics).

Note that the propagation path information may be at least one of a channel quality indicator (CQI), a precoding matrix indicator (PMI), a precoding type indicator (PTI), a rank indicator (RI) and/or others. Note that a PMI determined by a base station may be referred to as a "TPMI (Transmitted PMI)."

In existing LTE, CSI is estimated (measured) on the receiving side (for example, UEs) based on reference signals (RSs), and fed back to the transmitting side (for example, a BS). These reference signals may include cell-specific reference signals (CRSs), channel state information reference signals (CSI-RSs) and/or other signals, or may be reference signals that are defined apart from these (for example, beam-specific reference signals (BRSs) that are unique to beams (vary per beam)).

Note that, in UEs, information related to these reference signals (for example, information about the resources used to transmit downlink reference signals) may be pre-configured (reported) by high layer signaling (for example, RRC (Radio Resource Control) signaling, MAC (Medium Access Control) signaling, broadcast information (MIB (Master Information Block), SIBs (System Information Blocks), etc.)), physical layer signaling (for example, downlink control information (DCI: Downlink Control Information)) or a combination of these.

In NR, study is underway to support two types of CSI reports. Type-I feedback is also referred to as "normal feedback," and this is codebook-based PMI feedback with normal spatial resolution, such as one used in existing LTE.

Type-II feedback is also referred to as "enhanced feedback," and this is true (more detailed) feedback and/or codebook-based feedback with higher spatial resolution. With type-II feedback, for example, true channel states (for example, unquantized channel states) and so on may be fed back. Presumably, type II is suitable when a large number of beams are used. Note that feedback information related to beams may be included in both type I and type II.

When a BS receives type-II CSI feedback, the base station needs to judge with which beams' measurement results the UE has prepared this feedback. The codebook which the UE uses to calculate CSI may be associated with the number and positions of beams, for example.

Several beam selection methods for type-II feedback are under research. One of them is the free beam selection method (free beam selection). While the free beam selection method has no limit in terms of beam selection and can achieve high performance, when the number of beams increases, the overhead that is required to report beams also increases.

Another one is the beam group-based beam selection method (beam group-based beam selection). With the beam group-based beam selection method, a beam group is defined in advance, which is comprised of a number of sets of beams, and control can be performed on a per beam group basis, so that the overhead is small. However, the performance gain is limited, because the selection of beams is limited to a beam group that is defined in advance.

Figure 1B:
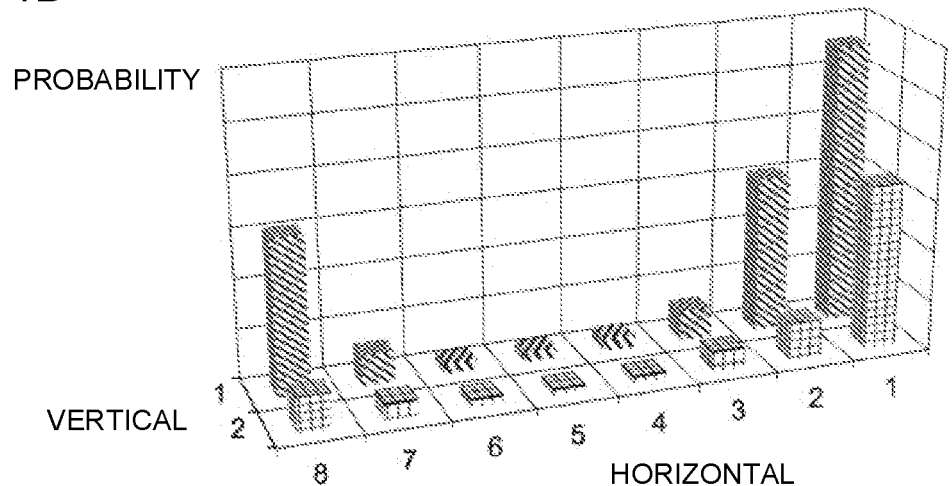
Figure 1C:
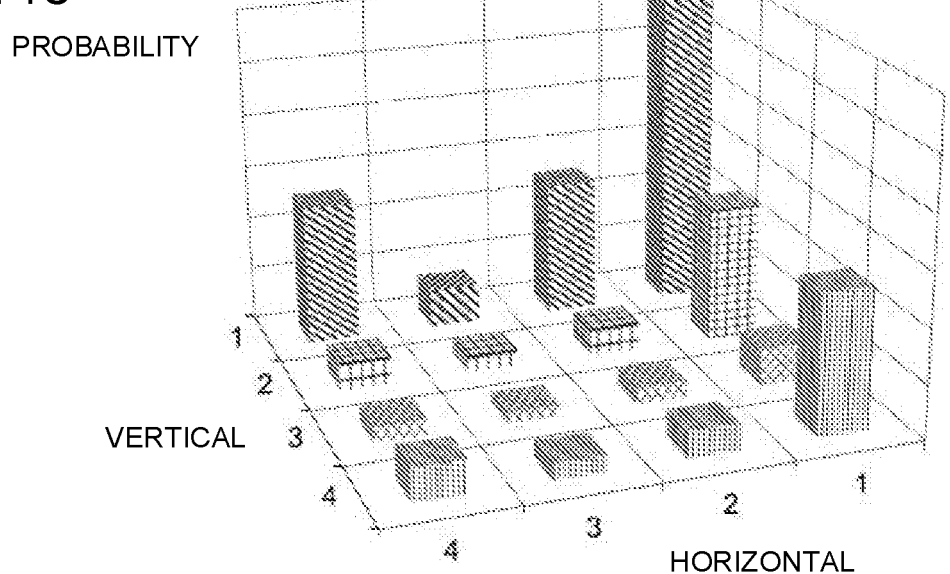

Now, with reference to FIGS. 1A to 1C, characteristics of multiple beams that are likely to be used in sets (combined) will be described. FIGS. 1A to 1C are diagrams to show examples of beam selection probability at two-dimensional antenna ports.

FIGS. 1A and 1B show examples where (N1, N2)=(2, 8) holds, while FIG. 1C shows an example where (N, N2)=(4, 4) holds. Here, N1 and N2 each indicate the number of antenna ports that are used to transmit predetermined signals (for example, reference signals), per polarization, in a given direction. Here, N1 is the number of antenna ports in the vertical direction ("vertical"), and N2 is the number of antenna ports in the horizontal direction ("horizontal"), but the directions of polarization are not limited to these.

The coordinates of an antenna port where a certain beam is transmitted are represented by (v, h), where v may be an integer between 1 and N1, and h may be an integer between 1 and N2. Although this example will assume, for ease of explanation, that the strongest beam (which may be referred to as the "main beam," "leading beam," and so forth) is located at (v, h)=(1, 1), the location of the leading beam is not limited to this.

As shown in FIGS. 1A to 1C, combined beams have a high probability of being located around the leading beam. For example, the beams corresponding to (v, h)=(1, 1), (1, 2), (2, 1), (1, 8) and others have a high probability of getting selected.

Also, FIGS. 1A and 1B, when compared, may show that combined beams are not fixed. For example, the beam of (v, h)=(1, 2) and the beam of (v, h)=(2, 1) can both be selected with similar probability. The beam of (v, h)=(1, 3) and the beam of (v, h)=(2, 2) can both be selected with similar probability. Furthermore, referring to FIG. 1C, it is clear that combined beams are not fixed.

Therefore, when the beam group-based beam selection method is employed, sets of beams that are not defined in the beam group cannot be used, and therefore there is a risk that optimal beams cannot be selected and/or the CSI of an optimal beam set cannot be reported. In addition, when the free beam selection method is adopted, there is a problem that the number of bits required for CSI reporting increases when the number of beams increases. Consequently, assuming that a UE sends type-II feedback, if a CSI report is sent based on an existing beam selection method (existing code book), problems such as a decrease in communication throughput and a deterioration of received quality may arise.

So, the present inventors have derived a beam selection method for mitigating feedback overhead and sending type-II feedback in a flexible manner.

Now, embodiments of the present invention will be described in detail below with reference to the accompanying drawings. Note that the radio communication methods of the above-described embodiments may be applied individually or may be applied in combination.

(Radio Communication Method)

The beam selection method used in one embodiment of the present invention is a hybrid beam selection method that can realize a trade-off between free beam selection and beam group-based beam selection. The hybrid beam selection method selects a predetermined number of beams (for example, L beams) from a beam pattern (beam group) comprised of a first number of beams (for example, L1 beams) and a second number of freely-selected beams (for example, L2 beams). Here, L=L1+L2 holds. Note that L2 may be 1 or greater, and L2=0 may hold.

The beam pattern is a pattern that shows fixed beam sets, which are specified in advance in the specification, configured, and so forth. FIGS. 2A to 2C are diagrams to show examples of beam patterns for use in the hybrid beam selection method according to one embodiment of the present invention. FIGS. 2A to 2C show examples of beam patterns containing two, three and four beams, respectively.

FIGS. 2A to 2C each show four beam pattern candidates. Preferably, a beam pattern is configured to include the strongest beam (which may be referred to as the "main beam," "leading beam," and so on) and include beams that are adjacent to the leading beam as active beams (which may be also referred to as "measurement target beams" and so on). For example, in the beam patterns of FIGS. 2A to 2C, beams that are adjacent to the leading beam in vertical and lateral directions are shown as active beams.

Preferably, beam pattern candidates corresponding to a predetermined number of beams can be specified with a predetermined index (beam pattern index). For example, the beam patterns of FIGS. 2A to 2C, having four candidates, may be specified by two-bit beam pattern indices. For example, the candidates in each drawing, from the leftmost one, may correspond to the beam pattern indices "00," "01," "10" and "11." The associations between the locations and indices of beam sets are by no means limited to this example.

Note that the number of beam pattern candidates is preferably not more than a power of two (for example, 2, 4, 8 and so on), and 4 or less is particularly preferable. In this case, the number of bits of the beam pattern index can be reduced, so that the increase in the amount of feedback information, which will be described later, can be mitigated.

Note that the beam patterns are by no means limited to these. The leading beam and active beams do not necessarily have to be adjacent to each other (and may be discontinuous), and active beams may be located only in lateral direction, vertical directions or oblique directions with respect to the leading beam. Also, the number of beams specified by one beam pattern (included in one beam pattern) may be a number other than two, three and four. The number of beam pattern candidates may vary depending on the number of beams specified by the beam pattern.

Information about beam patterns (for example, information about associations, such as the locations of beams included in a beam pattern comprised of a predetermined number of beams) may be reported to the UE and/or BS using higher layer signaling (for example, RRC signaling, broadcast information, etc.), physical layer signaling (for example, DCI or uplink control information (UCI)), or a combination of these.

When the base station receives type-II CSI feedback, the base station needs to judge with which beams' measurement results the UE has prepared this feedback. Therefore, it is preferable that the UE includes information for identifying the measured beams in feedback information.

Figure 3A:
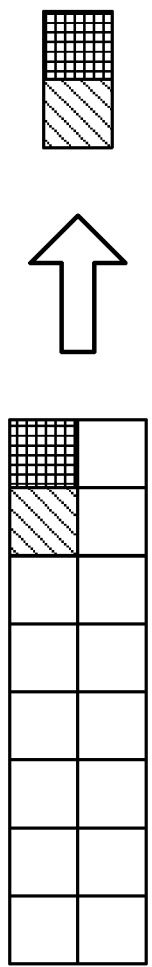
FIGS. 3A to 3C are diagrams to show examples of specifying beams in a hybrid beam selection method.
Figure 3B:
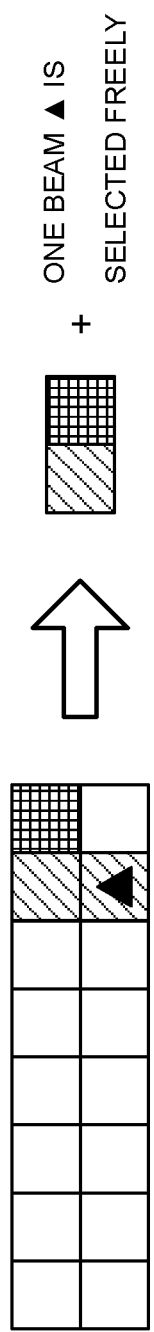
Figure 3C:
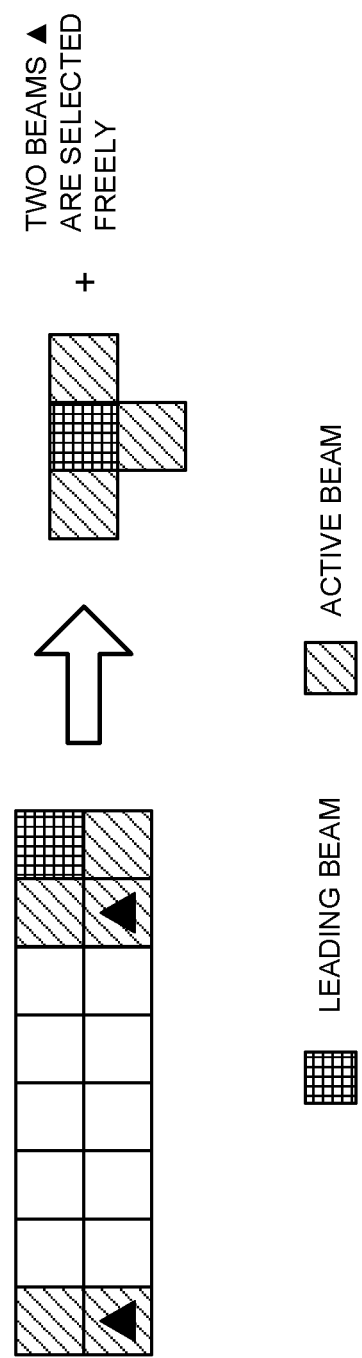

The method of identifying reporting-target beams will be described with reference to FIGS. 3A to 3C. The UE selects a predetermined beam pattern as a reporting target, based on L1. Furthermore, the UE also selects L2 beams, apart from the beams included in the predetermined beam pattern, as reporting targets. FIGS. 3A to 3C are diagrams to show examples of specifying beams in the hybrid beam selection method. Here, a case is assumed in which (N1, N2)=(2, 8) holds and in which the probability of beam selection is as in FIG. 1A, but this is not limiting. This example assumes that the UE judges that (v, h)=(1,1) is the leading beam.

FIG. 3A is a diagram to show examples of reporting target beams when L1=2 and L2=0 are configured in the UE from the network. In this example, the UE selects a beam pattern, in which (v, h)=(1, 2) is the active beam, from the beam patterns with L1=2 (FIG. 2A), as a reporting target.

FIG. 3B is a diagram to show examples of reporting target beams when L1=2 and L2=1 are configured in the UE from the network. In this example, the UE selects a beam pattern, in which (v, h)=(1, 2) is the active beam, from the beam patterns with L1=2 (FIG. 2A), as a reporting target, and, furthermore, selects the beam of (v, h)=(2, 2) as a reporting target. Although beam patterns with L1=3 (FIG. 2B) cannot represent the three beams of FIG. 3B, it is possible to increase the number of beam sets that can be handled, by increasing the value of L2.

FIG. 3C is a diagram to show examples of reporting target beams when L1=4 and L2=2 are configured in the UE from the network. In this example, the UE selects a beam pattern, in which (v, h)=(1, 2), (2, 1) and (8, 1) are active beams, as a reporting target, from the beam patterns with L1=4 (FIG. 2C), and, in addition, selects the beams of (v, h)=(2, 2) and (8, 2) as reporting targets. This example, again, shows that the flexibility in selection of beams can be improved by combining fixed beam patterns corresponding to L1 beams with L2 freely-selected beams.

FIGS. 3A to 3C show that, even if L=L1+L2 is constant, as L2 increases, the combination of beams that can be represented increases. The beams specified in FIGS. 3A to 3C are examples, and these are by no means limiting.

From the perspective of reducing the load on the UE associated with codebook selection, it is more preferable to pre-configure L1 and L2 in the UE, and allow the UE to select reporting target beams based on these L1 and L2. However, the UE may dynamically determine (change) and use L1 and/or L2.

[Flow of Type-II CSI Reporting]

Figure 4:
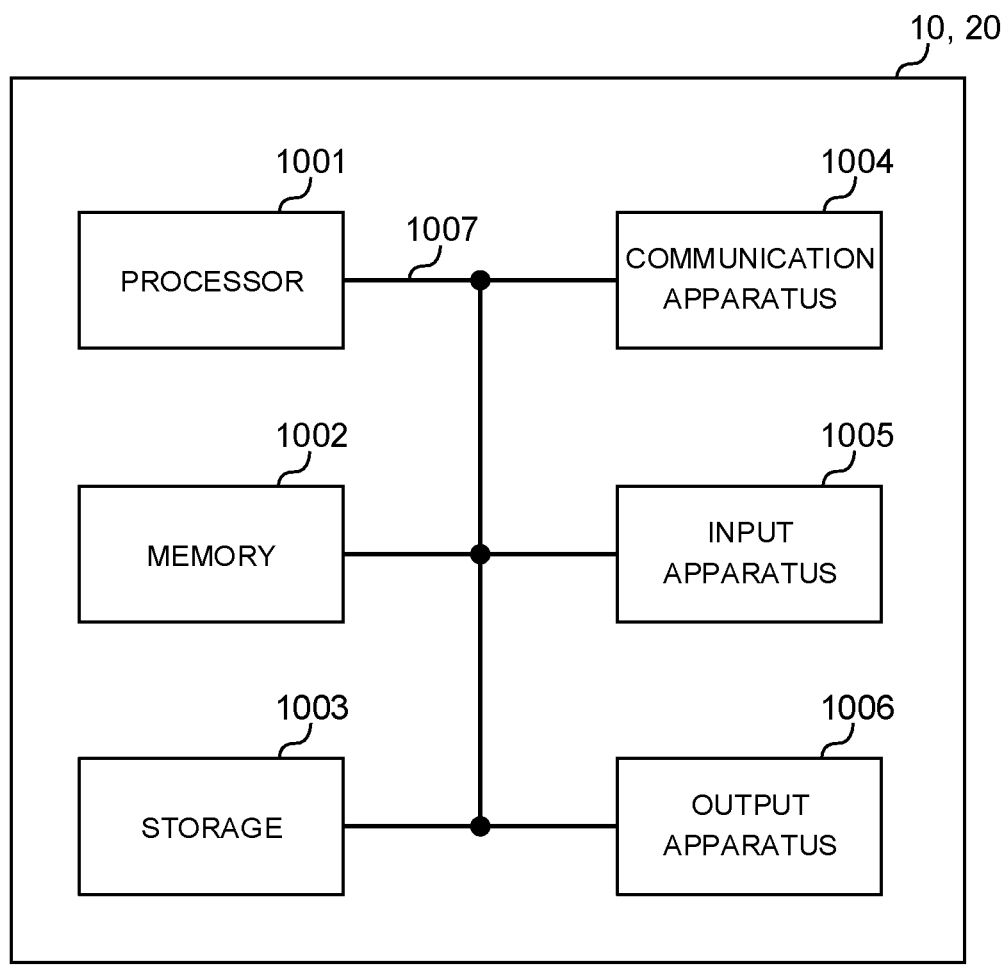
FIG. 4 is a diagram to show an example of the flow of a type-II CSI report based on a hybrid beam selection method.

FIG. 4 is a diagram to show an example of the flow of a type-II CSI reporting based on the hybrid beam selection method. The order of step in the flow is by no means limiting. Also, some of the steps may be omitted (for example, when the corresponding parameter is defined in advance).

The BS configures whether type-II CSI reporting is enabled or disabled, in the UE (step S101). For example, if a parameter to show that type-II CSI reporting is enabled is configured, the UE may determine that type-II CSI reporting is enabled.

The BS configures the CQI report configuration (which may be referred to as, for example, "CQI-ReportConfig") in the UE (step S102). The CQI report configuration includes, for example, information about feedback timing (feedback cycle, trigger configuration, etc.), parameters that are used to calculate feedback information (such as PMI) and so on. The CQI report configuration may be referred to as "CSI report configuration," "feedback configuration," and so on.

The BS configures the number of antenna ports and the oversampling factor (spatial oversampling rate) in the UE (step S103). Here, the number of antenna ports in a predetermined direction (for example, the vertical direction) and another predetermined direction (for example, the horizontal direction) are represented as N1 and N2, respectively, but these directions are by no means limiting. Also, the oversampling factors in the predetermined direction (for example, the vertical direction) and in another predetermined direction (for example, in the horizontal direction) are represented as O1 and O2 respectively, but these directions are by no means limiting.

Note that N1*N2 antenna ports provided in the base station may be connected to different transceiver units (TxRUs). That is, power may be supplied from one transceiver unit to one antenna port. Also, O1*O2 may be the number of antenna elements transmitting signals from one transceiver unit.

The BS configures above-mentioned L1, which is the number of beams (the number of ports) included in a beam pattern to be reported, and above-mentioned L2, which is the number of freely-selected beams (the number of ports) to be reported, in the UE (step S104). Note that the parameters that are configured in the UE are not limited to the combination of L1 and L2, as long as the UE is able to specify L1 and L2. For example, the BS may configure at least two of above mentioned L, which is the total number of beams (the total number of ports) to be reported, L1 and L2, in the UE.

The BS configures a codebook subset restriction (which may be also referred to as, for example, "codebookSubsetRestriction") in the UE (step S105). The codebook subset restriction is used to limit CSI (for example, PMI) reporting within a predetermined codebook subset. This codebook subset restriction limits, for example, the number of feedback bits and so on.

The UE sends a CSI report based on the configured parameters (step S106). The UE may transmit existing CSI (for example, CQI, PMI, RI and PTI) and so on in the form of a type-II CSI report, or transmit different information from existing CSI (for example, predetermined quality information).

Note that the configurations of steps S101 to S105 may be provided (reported, commanded, etc.) in the UE by using higher layer signaling (for example, RRC signaling, broadcast information, etc.), physical layer signaling (for example, DCI), or a combination of these.

Figure 5:
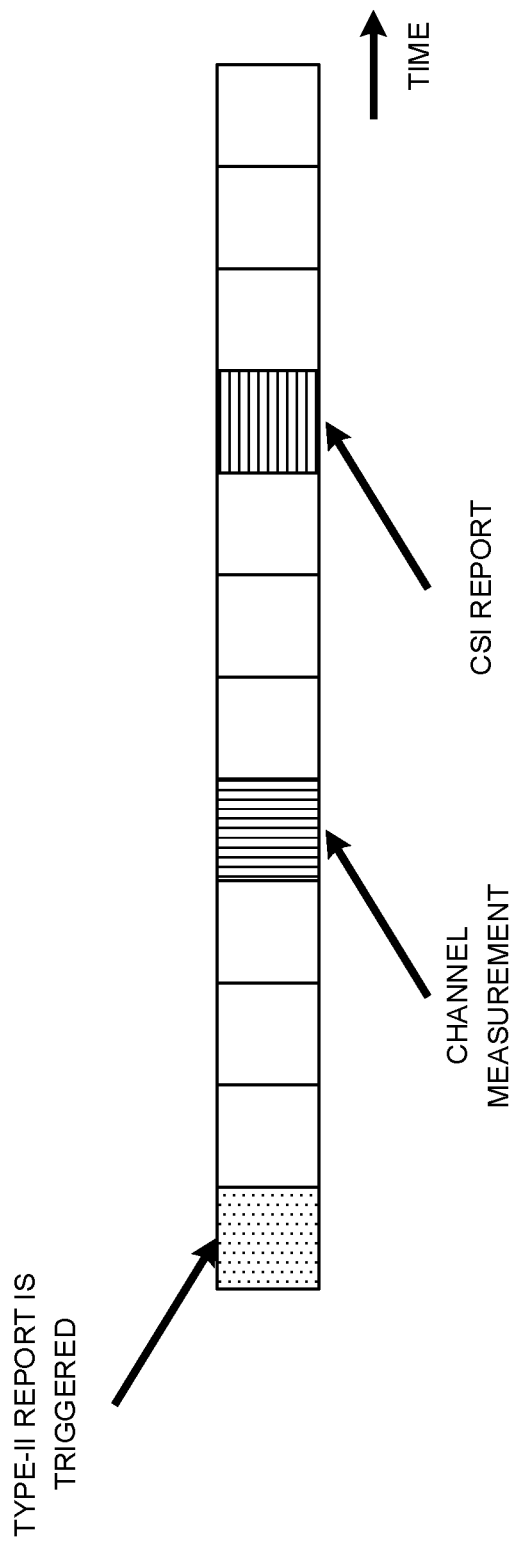
FIG. 5 is a diagram to show an example of a type-II CSI report based on a trigger.

Note that type-II CSI reporting may be performed based on a predetermined trigger or periodically. FIG. 5 is a diagram to show an example of type-II CSI reporting based on a trigger. FIG. 5 shows an example, in which a type-II report is triggered at a predetermined timing, and in which the UE performs channel measurement a predetermined period of time after the trigger, and sends a CSI report another predetermined period of time after the measurement (this period may be the same as or different from the period from the trigger to the channel measurement). The trigger may be reported, for example, via physical layer signaling (DCI).

[Amount of Feedback Information]

The information to feed back includes following (1) to (5): (1) information to represent (the location of) the leading beam (which may be also referred to as, for example, "leading beam index"), (2) information to represent beam patterns that are selected (which may be also referred to as, for example, "beam pattern index"), (3) information to represent freely-selected beams (which may be also referred to as, for example, "free beam index"), (4) information about the amplitude and/or the phase of beams other than the leading beam, and (5) information about the co-phase between polarizations. Note that the information of (1) to (5) may be read as information for specifying the information concerned.

All or a part of these pieces of information may be transmitted at the same timing (for example, in the same subframe, slot, TTI, etc.) as a CSI report, or may be transmitted at different timings. When these pieces of information are transmitted at different timings from a CSI report, the UE may calculate the CSI (for example, the PMI, the CQI, etc.) based on the beam pertaining to the information of above (1) to (5) provided in the last report.

Note that, in case a type-II CSI report is based solely on the free beam selection method, it is necessary to feedback (1), (3), (4) and (5) above. Also, in case a type-II CSI report is based on the beam group-based beam selection method alone, it is necessary to feed back above (1), (2), (4) and (5).

Now, the amounts of information in (1) to (5) will be explained. Here, an example to assume the use of a two-stage codebook of W=W1*W2 as a type-II codebook W is shown, but this is by no means limiting. In this case, for example, W1 can be determined by following equation 1.

$$W1 = \begin{bmatrix} B & 0 \\ 0 & B \end{bmatrix}, \quad \text{(Equations 1)}$$

$$B = \left[ P_0 b_{k_1^{(0)} k_2^{(0)}}, \Lambda, P_{L1-1} b_{k_1^{(L1-1)} k_2^{(L1-1)}}, \right.$$

$$\left. \Lambda, P_{L1+L2-1} b_{k_1^{(L1+L2-1)} k_2^{(L1+L2-1)}} \right]$$

where $b_{k_1 k_2}$ is two-dimensional beams from over-sampled grids, and represents the phase of the beams.

Also, $P_i$ is the beam power scaling factor for beam i (for example, $P_1$ is a real number between 0 and 1).

When the antenna port is of a cross-polarization type, beam selection (W1) may be the same between two polarizations, and W2 may be used to represent the co-phase between two polarizations.

Referring to equation 1, regarding above (1), the leading beam index is)) $k_1^{(0)} * k_2^{(0)}$, $k_1^{(0)}$ is an integer between 0 and N1*O1−1, and $k_2^{(0)}$ is an integer between 0 and N2*O2−1. That is, in order to specify the leading beam, a number of bits that can represent N1*N2*O1*O2 are needed.

Regarding above (2), the beam pattern index has only to represent beam pattern candidates to match the number beams, L1. For example, if four beam pattern candidates match the number of beams shown in FIGS. 1A to 1C, the beam pattern index can be represented with two bits.

Referring to above (3), the number of bits of the free beam index may be determined based on N1, N2, L1 and L2, for example. The number of the bits may be determined by following equation 2, for example.

$$\left\lceil \log_2 \binom{N1*N2 - L1}{L2} \right\rceil \quad \text{(Equation 2)}$$

Referring to (4) above, the information of the amplitude and/or phase of beams other than the leading beam depends on the number of beams L (=L1+L2) and the quantization resolution (modulation scheme). For example, if the signal that is transmitted in the beam is modulated by QPSK (Quadrature Phase Shift Keying), the information of the phase can be represented by 2*(L−1) bits, and, when this signal is modulated by 8-PSK, the information of the phase can be represented by 3*(L−1) bits.

Regarding (5) above, the information about the co-phase between polarizations depends on the number of beams L (=L1+L2) and the quantization resolution (modulation scheme).

For example, if the signal transmitted in a beam is modulated by QPSK, the information about the co-phase between polarizations can be represented by 2*L bits, and, when this signal is modulated by 8-PSK, the information about the co-phase between polarizations is represented by 3*L bits.

FIG. 6 is a diagram to show an example of the number of bits required to feed back a type-II CSI report. In this example, (N1, N2)=(2, 8), (O1, O2)=(4, 8) holds. Considering cross-polarization, the number of antenna ports is 2*8*2=32.

As for the method of beam selection, the hybrid beam selection method ("Hybrid") and the free beam selection method ("Free Selection"), which is a conventional method, are evaluated. Free selection can be seen as a method in which L1=1 is fixed in the hybrid method. FIG. 6 shows an example where L2 in the hybrid method is 1 or more.

Since N1*N2*O1*O2=512=$2^9$, in either method, nine bits are necessary for the leading beam index. When there are four candidates, the beam pattern index requires two bits if L1 is two or more, and 0 bits if L1 is less than two. The number of bits of the free beam index is calculated based on equation 2 above. The total number of payload bits for W1, which sums up these values, increases as L increases and decreases as L1 increases.

Furthermore, a case where the modulation signal is an 8-PSK signal is shown here to illustrate an example of the payload for W2, this increases as L increases, as illustrated.

As explained above, according to one embodiment of the present invention, a tradeoff between feedback overhead and performance can be suitably realized even when type-II feedback is used.

Note that a codebooks for use by the UE and/or the BS may be generated so as to contain codewords that correspond to beams of a predetermined beam pattern and/or one or more freely-selected beams. For example, given a set of the coordinates of all antenna ports (v, h) corresponding to L selected (determined) (=L1+L2) beams, a codebook to correspond to this set may be generated.

(Variations)

In this specification, a beam is identified (differences among multiple beams are judged) based on, but not limited to, at least one of following (1) to (8): (1) the resource (for example, time and/or frequency resource); (2) the antenna port; (3) precoding (for example, whether or not precoding is applied, what precoding weight is applied, etc.); (4) the transmission power; (5) the phase rotation; (6) the beam width; (7) the beam angle (for example, the tilt angle); and (8) the number of layers.

Also, the term "beam" used in this specification may be used interchangeably with at least one of above (1) to (8), and, for example, a "beam" may be read as a "resource," an "antenna port," and so on.

(Radio Communication System)

Now, the structure of a radio communication system according to one embodiment of the present invention will be described below. In this radio communication system, communication is performed using one or a combination of the radio communication methods according to the herein-contained embodiments of the present invention.

Figure 7:
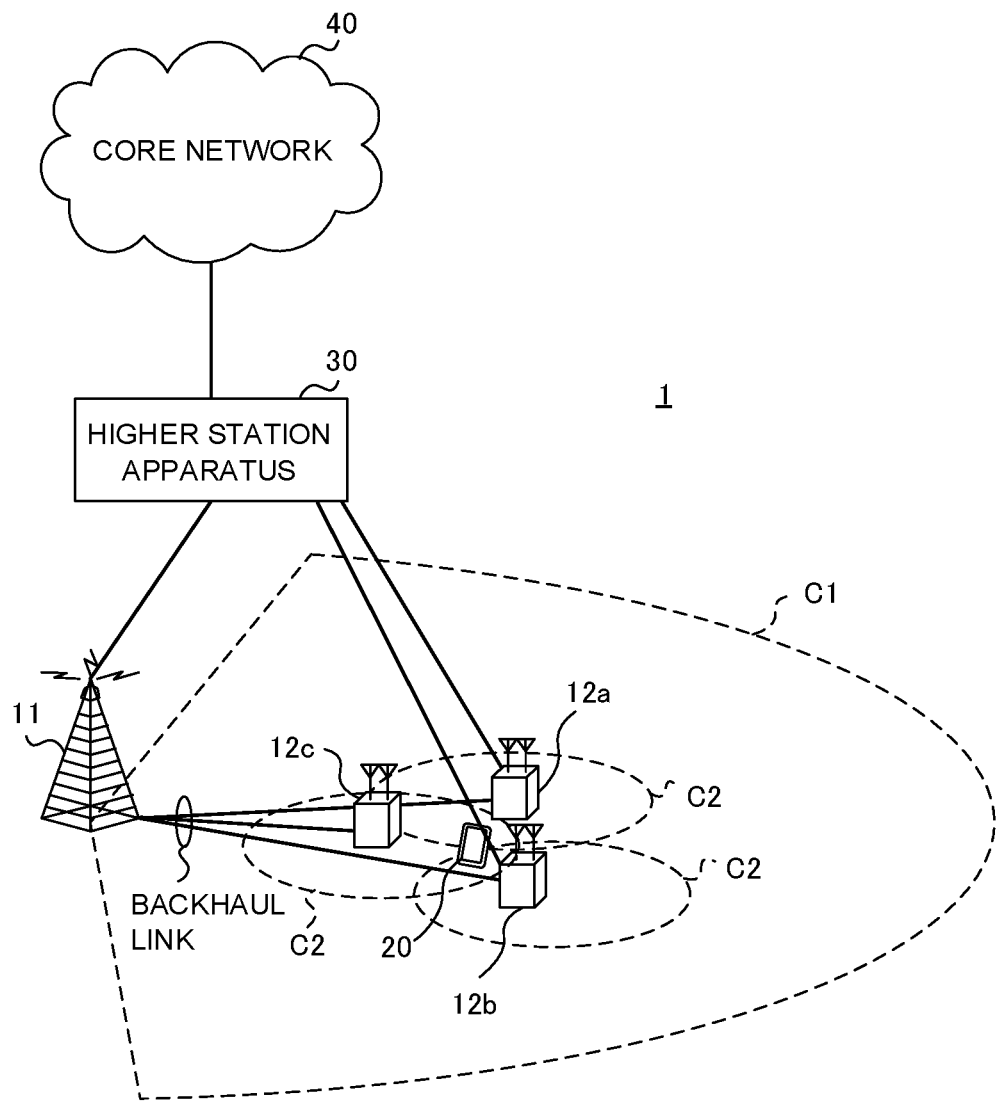
FIG. 7 is a diagram to show an example of a schematic structure of a radio communication system according to one embodiment of the present invention.

FIG. 7 is a diagram to show an example of a schematic structure of a radio communication system according to one embodiment of the present invention. A radio communication system 1 Can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. Delivery acknowledgment information (also referred to as, for example, "retransmission control information," "HARQ-ACKs," "ACK/NACKs," etc.) of HARQ (Hybrid Automatic Repeat reQuest) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 8:
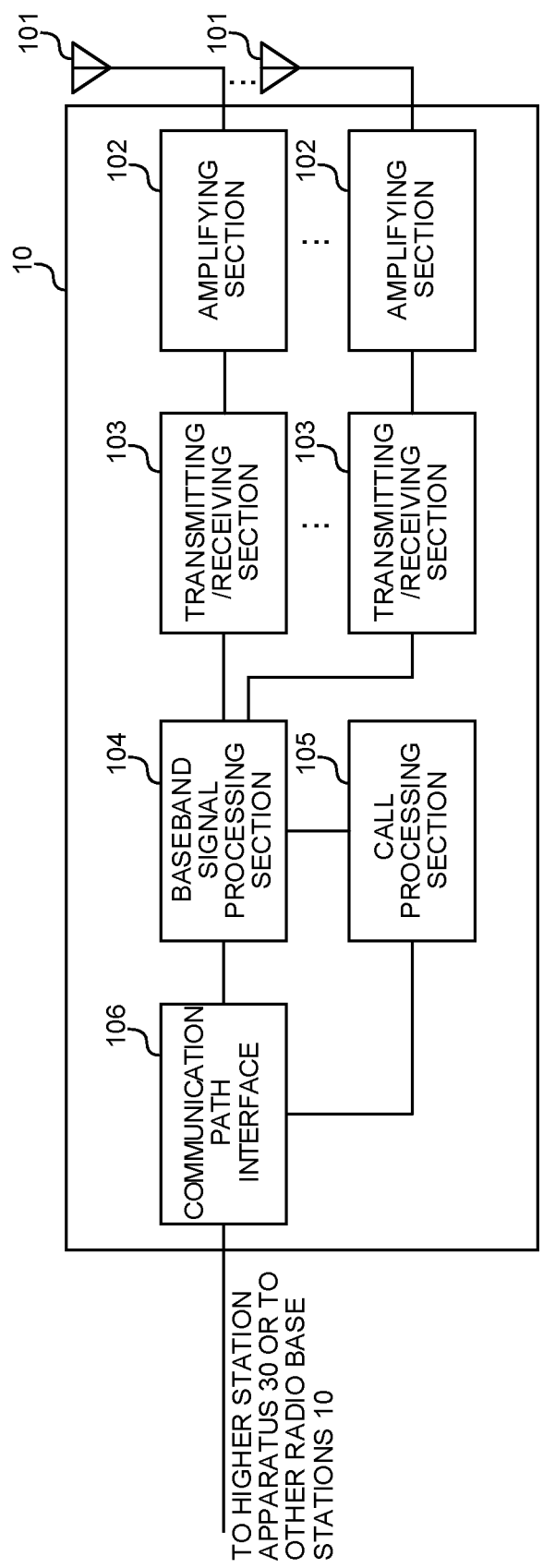
FIG. 8 is a diagram to show an example of an overall structure of a radio base station according to one embodiment of the present invention.

FIG. 8 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains.

Furthermore, the transmitting/receiving antennas 101 may be constituted by, for example, array antennas.

The transmitting/receiving sections 103 may receive feedback information related to a selected beam pattern and freely-selected beams. The transmitting/receiving sections 103 may transmit L, L1, L2, N1, N2, O1, O2, beam pattern and like pieces of information.

Figure 9:
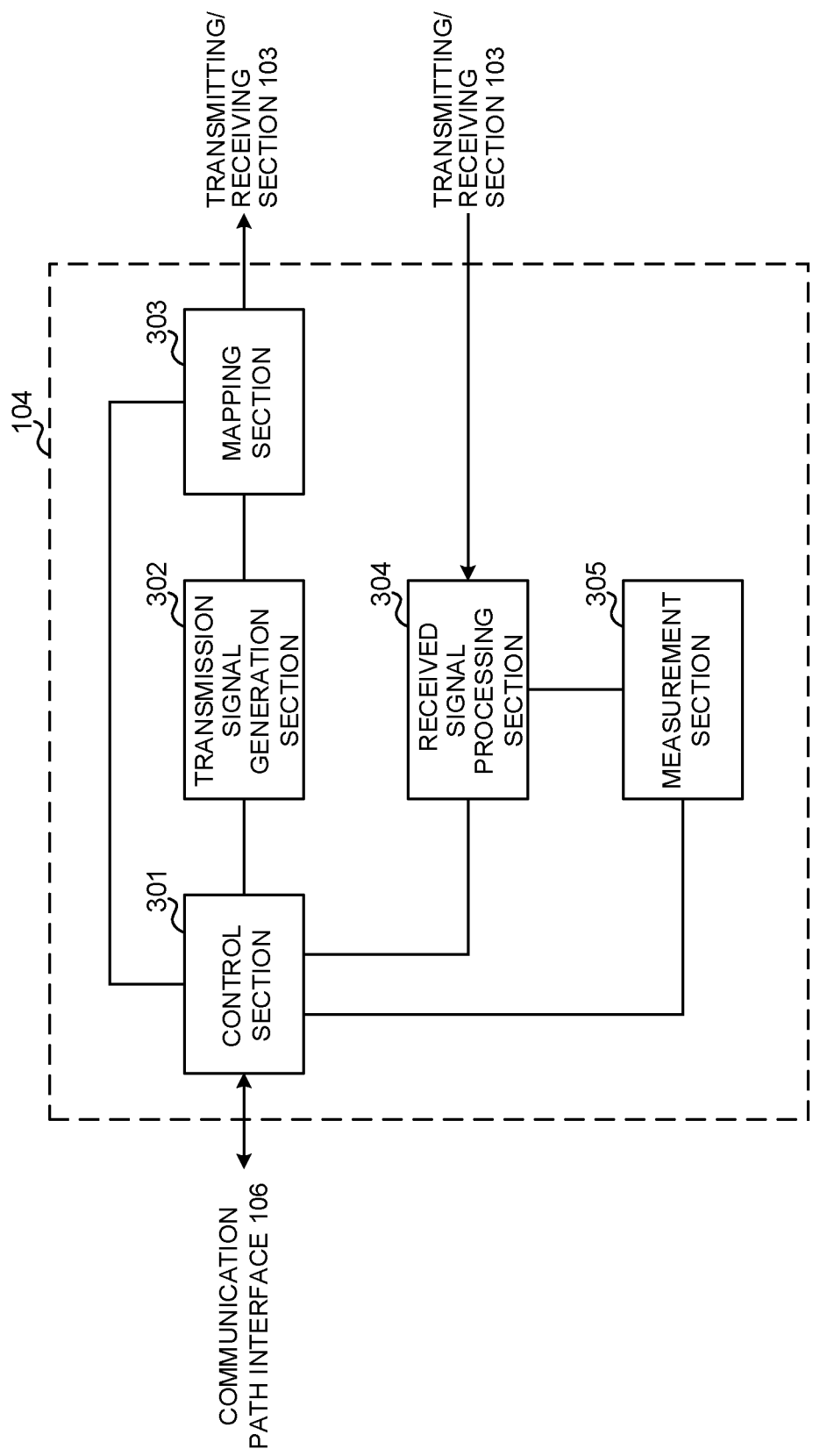
FIG. 9 is a diagram to show an example of a functional structure of a radio base station according to one embodiment of the present invention.

FIG. 9 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 Controls the whole of the radio base station 10. The control section 301 Can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 Controls the signal receiving processes in the received signal processing section 304, the measurements of signals in the measurement section 305, and so on.

The control section 301 controls scheduling (for example, resource allocation) of system information, downlink data signals (for example, signals transmitted in the PDSCH), downlink control signals (for example, signals transmitted in the PDCCH and/or the EPDCCH, such as delivery acknowledgment information), and so on. The control section 301 Controls the generation of downlink control signals, downlink data signals and so on, based on the results of deciding whether or not retransmission control is necessary for uplink data signals, and so on. Also, the control section 301 Controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

⇒In addition, the control section 301 may control the scheduling of uplink data signals (for example, signals transmitted in the PUSCH), uplink control signals (for example, signals transmitted in the PUCCH and/or the PUSCH, such as acknowledgment information), random access preambles (for example, signal transmitted by the PRACH), uplink reference signals and so on.

The control section 301 may exert control so that transmitting beams and/or receiving beams are formed using the digital BF (for example, precoding) by the baseband signal processing section 104 and/or the analog BF (for example, phase rotation) by the transmitting/receiving sections 103. The control section 301 may exert control so that beams are formed based on downlink transmission path information, uplink transmission path information and so on. These pieces of transmission path information may be obtained from the received signal processing section 304 and/or the measurement section 305.

The control section 301 may determine a beam pattern that shows fixed sets of beams, and determine at least one beam that is not included in the beam pattern (freely-selected beam). For example, the control section 301 may select (specify) a beam pattern that is comprised of a first number of beams (for example, L1 beams), and select (specify) a second number of freely-selected beams (for example, L2 beams). Also, the control section 301 may generate and use a codebook that corresponds to the beams included in the selected beam pattern and the freely-selected beams.

Based on the number of beams (L1) specified in the beam pattern and/or the number of freely-selected beams (L2), the control section 301 may determine the above beam pattern and/or freely-selected beams.

Also, the control section 301 may exert control so that feedback information concerning the selected beam pattern and/or the freely-selected beams is received. The feedback information may be configured to include an index to represent the leading beam, or may be configured to include at least two indices—namely, an index to represent the selected beam pattern and an index to represent the freely-selected beams determined.

The control section 301 may determine the number of bits of the index to represent the freely-selected beams based on the number of antenna ports in a predetermined direction (for example, N1), the number of antenna ports in another predetermined direction (for example, N2), above L1, and L2.

Note that transmission using transmission beams may be paraphrased as transmission of signals to which predetermined precoding is applied.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

(User Terminal)

Figure 10:
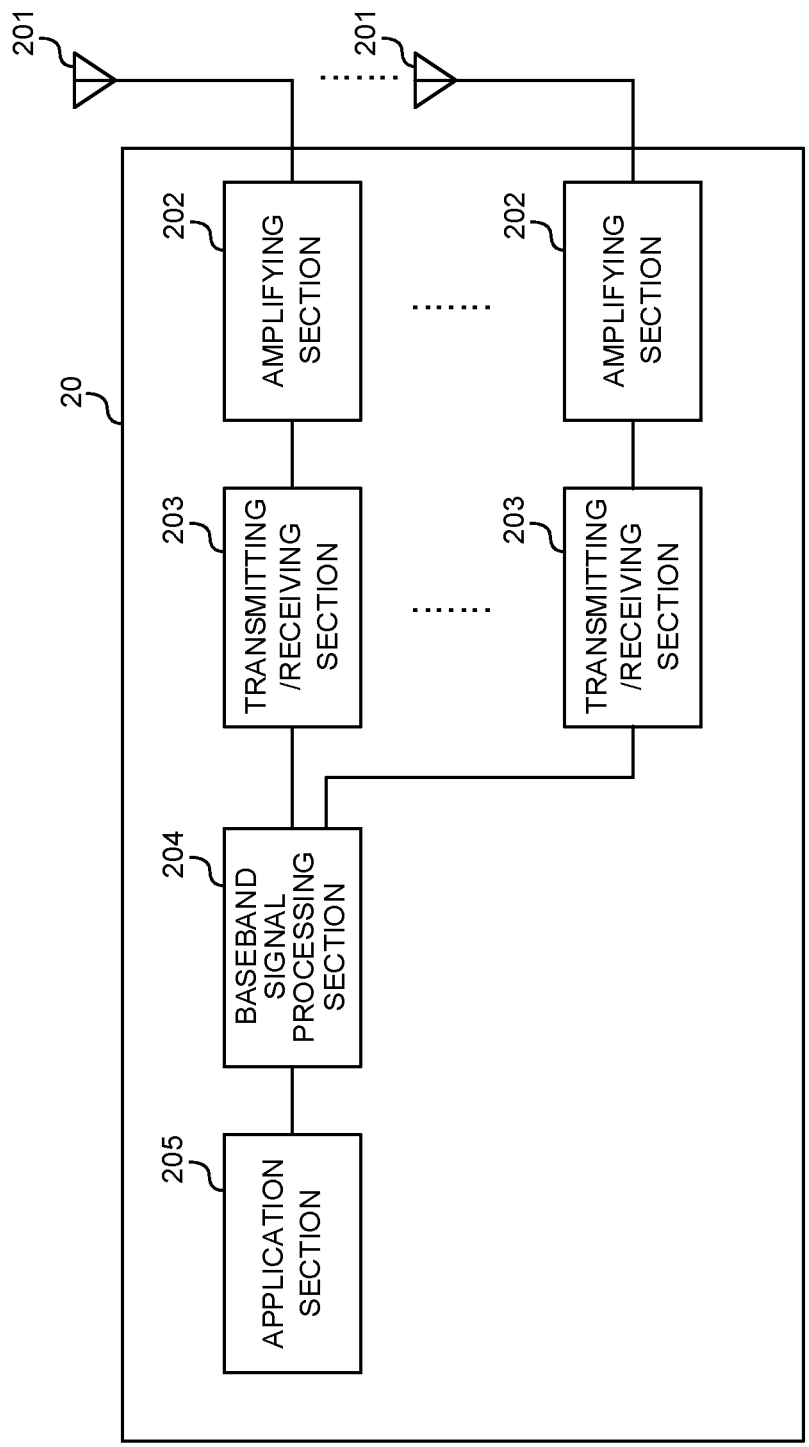
FIG. 10 is a diagram to show an example of an overall structure of a user terminal according to one embodiment of the present invention.

FIG. 10 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 may send feedback information related to a selected beam pattern and freely-selected beams. The transmitting/receiving section 203 may receive L, L1, L2, N1, N2, O1, O2, beam pattern and like pieces of information.

Figure 11:
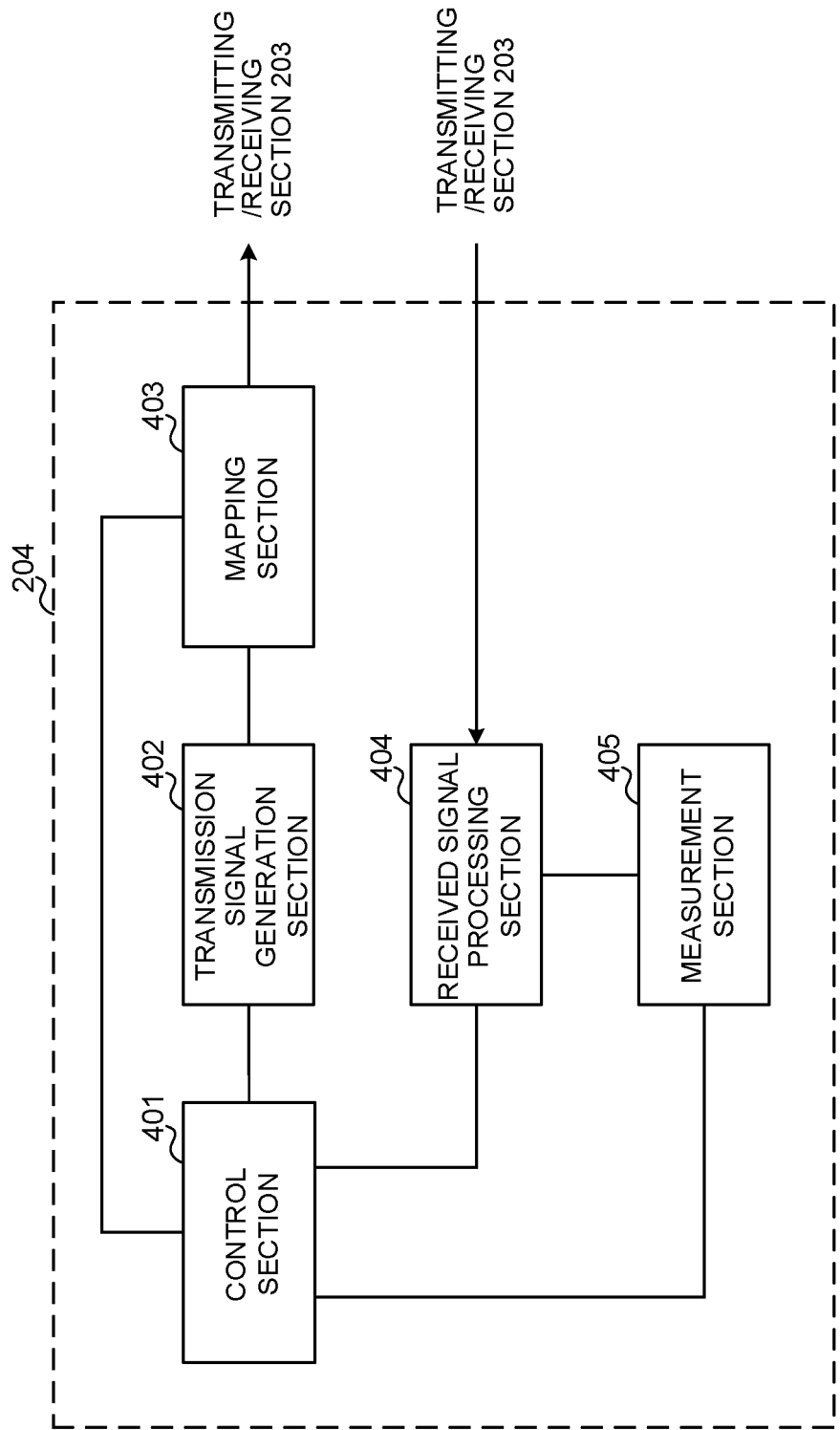
FIG. 11 is a diagram to show an example of a functional structure of a user terminal according to one embodiment of the present invention.

FIG. 11 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 Controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 Controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 Controls the generation of uplink control signals and/or uplink data signals based on the results of deciding whether or not retransmission control is necessary for the downlink control signals and/or downlink data signals, and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203. The control section 401 may perform control so that beams are formed based on downlink transmission path information, uplink transmission path information, and so on. These pieces of transmission path information may be obtained from the received signal processing section 404 and/or the measurement section 405.

The control section 401 may determine a beam pattern that shows fixed sets of beams, and select at least one beam that is not included in the beam pattern (freely-selected beam). For example, the control section 401 may select (specify) a beam pattern that is comprised of a first number of beams (for example, L1 beams), and select (specify) a second number of freely-selected beams (for example, L2 beams). Also, the control section 401 may generate and use a codebook that corresponds to the beams included in the selected beam pattern and the freely-selected beams.

Based on the number of beams (L1) specified in the beam pattern and/or the number of freely-selected beams (L2), the control section 301 may determine the above beam pattern and/or freely-selected beams.

Also, the control section 401 may exert control so that feedback information concerning the selected beam pattern and/or the freely-selected beams is transmitted. The feedback information may be configured to include an index to represent the leading beam, or may be configured to include at least two indices—namely, an index to represent the selected beam pattern and an index to represent the freely-selected beams determined.

The control section 401 may determine the number of bits of the index to represent the freely-selected beams based on the number of antenna ports in a predetermined direction (for example, N1), the number of antenna ports in another predetermined direction (for example, N2), above L1, and L2.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 Commands the transmission signal generation section 402 to generate an uplink data signal.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

That is, a radio base station, a user terminal and so on according to one embodiment of the present invention may function as a computer that executes the processes of the radio communication method of the present invention. FIG. 12 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and the like for implementing the radio communication methods according to one embodiment of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be composed of one or more periods (frames) in the time domain. Each of one or more periods (frames) constituting a radio frame may be referred to as a "subframe." Furthermore, a subframe may be composed of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be composed of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices.

In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-included description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 Control information (L1 Control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-018951, filed on Feb. 3, 2017, including the specification, drawings and abstract, is incorporated herein by reference in its entirety.

The invention claimed is:

1. A user terminal comprising:
a control section that determines a beam pattern that shows a fixed set of beams, and determines at least one beam that is not included in the beam pattern; and
a transmission section that transmits feedback information related to the beam pattern and the at least one beam that is determined.

2. The user terminal according to claim 1, further comprising a receiving section that receives information related to the number of beams specified by the beam pattern and/or the number of the at least one beam,
wherein the control section determines the beam pattern and the at least one beam based on the information.

3. The user terminal according to claim 1, wherein the feedback information includes an index to represent the beam pattern and an index to represent the at least one beam.

4. The user terminal according to claim 3, wherein the control section determines the number of bits of the index to represent the at least one beam based on the number of antenna ports in a predetermined direction, the number of antenna ports in another predetermined direction, the number of beams specified by the beam pattern and the number of the at least one beam.

5. A radio communication method in a user terminal, comprising steps of:
determining a beam pattern that shows a fixed set of beams, and determines at least one beam that is not included in the beam pattern; and
transmitting feedback information related to the beam pattern and the at least one beam that is determined.

6. The user terminal according to claim 2, wherein the feedback information includes an index to represent the beam pattern and an index to represent the at least one beam.

* * * * *